(12) United States Patent
Kraus

(10) Patent No.: US 8,602,135 B2
(45) Date of Patent: Dec. 10, 2013

(54) DRIVE QUAD MODULE

(75) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 1134 days.

(21) Appl. No.: 12/491,331

(22) Filed: Jun. 25, 2009

(65) Prior Publication Data

US 2010/0326746 A1  Dec. 30, 2010

(51) Int. Cl.
*G01C 21/36* (2006.01)

(52) U.S. Cl.
USPC .......... 180/14.1; 180/14.2; 180/14.3; 701/50; 56/10.2 A; 56/10.2 F; 56/11.9; 56/16.6

(58) Field of Classification Search
USPC ................... 180/14.1, 14.2, 14.3; 460/23, 59; 701/50; 56/10.2 A, 10.2 F, 11.9, 16.6
See application file for complete search history.

(56) References Cited

U.S. PATENT DOCUMENTS

| | | | | |
|---|---|---|---|---|
| 1,646,455 A * | 10/1927 | Johnson et al. | ................. | 56/15.3 |
| 2,040,605 A * | 5/1936 | Harder | ............................ | 56/15.4 |
| 2,494,388 A * | 1/1950 | Heth | ............................... | 56/153 |
| 2,744,374 A * | 5/1956 | Louthan | .......................... | 56/10.4 |
| 2,906,079 A * | 9/1959 | Coultas | ............................ | 56/16.2 |
| 3,345,808 A | 10/1967 | Van Der Lely | | |
| 3,460,698 A * | 8/1969 | Harris | ............................ | 414/502 |
| 3,576,227 A * | 4/1971 | Lippl et al. | .................... | 180/14.1 |
| 3,724,874 A * | 4/1973 | Simpson | ........................ | 280/408 |
| 4,018,036 A * | 4/1977 | Cicci et al. | .......................... | 56/1 |
| 5,904,365 A * | 5/1999 | Dillon | ........................... | 280/419 |
| 6,029,431 A * | 2/2000 | Dowler et al. | ................. | 56/14.3 |
| 6,587,772 B2 * | 7/2003 | Behnke | ........................... | 701/50 |
| 6,591,971 B1 | 7/2003 | Sheahan | | |
| 6,594,979 B2 * | 7/2003 | Krone et al. | .................... | 56/16.6 |
| 6,682,416 B2 * | 1/2004 | Behnke et al. | ................. | 460/114 |
| 6,712,691 B2 | 3/2004 | McLeod | | |
| 6,938,960 B1 | 9/2005 | Eby | | |
| 7,004,706 B1 | 2/2006 | Wilson | | |
| 7,155,888 B2 * | 1/2007 | Diekhans | .................... | 56/10.2 R |
| 7,168,636 B2 | 1/2007 | Lebeda et al. | | |
| 7,213,781 B2 | 5/2007 | Pakura | | |
| 7,277,784 B2 | 10/2007 | Weiss | | |
| 7,311,627 B2 | 12/2007 | Tarasinski | | |
| 7,363,154 B2 | 4/2008 | Lindores | | |
| 7,404,355 B2 | 7/2008 | Viaud et al. | | |
| 7,537,519 B2 * | 5/2009 | Huster et al. | ................... | 460/114 |
| 8,180,534 B2 * | 5/2012 | Burke et al. | ..................... | 701/50 |
| 2006/0047418 A1 * | 3/2006 | Metzler et al. | ................. | 701/207 |
| 2008/0245042 A1 * | 10/2008 | Brunnert et al. | ............. | 56/10.2 F |
| 2010/0108188 A1 * | 5/2010 | Correns et al. | ................... | 141/83 |

* cited by examiner

*Primary Examiner* — Kevin Hurley
*Assistant Examiner* — Michael Stabley
(74) *Attorney, Agent, or Firm* — Faegre Baker Daniels LLP

(57) ABSTRACT

A combination including a harvester, a generator vehicle, and a transport vehicle including a chassis, a motor, a plurality of traction devices, and a control unit aligning the transport vehicle in relation to at least one of the harvester and a previous path of the harvester. A method of positioning a train of transport vehicles in relation to a path of the harvester.

21 Claims, 10 Drawing Sheets

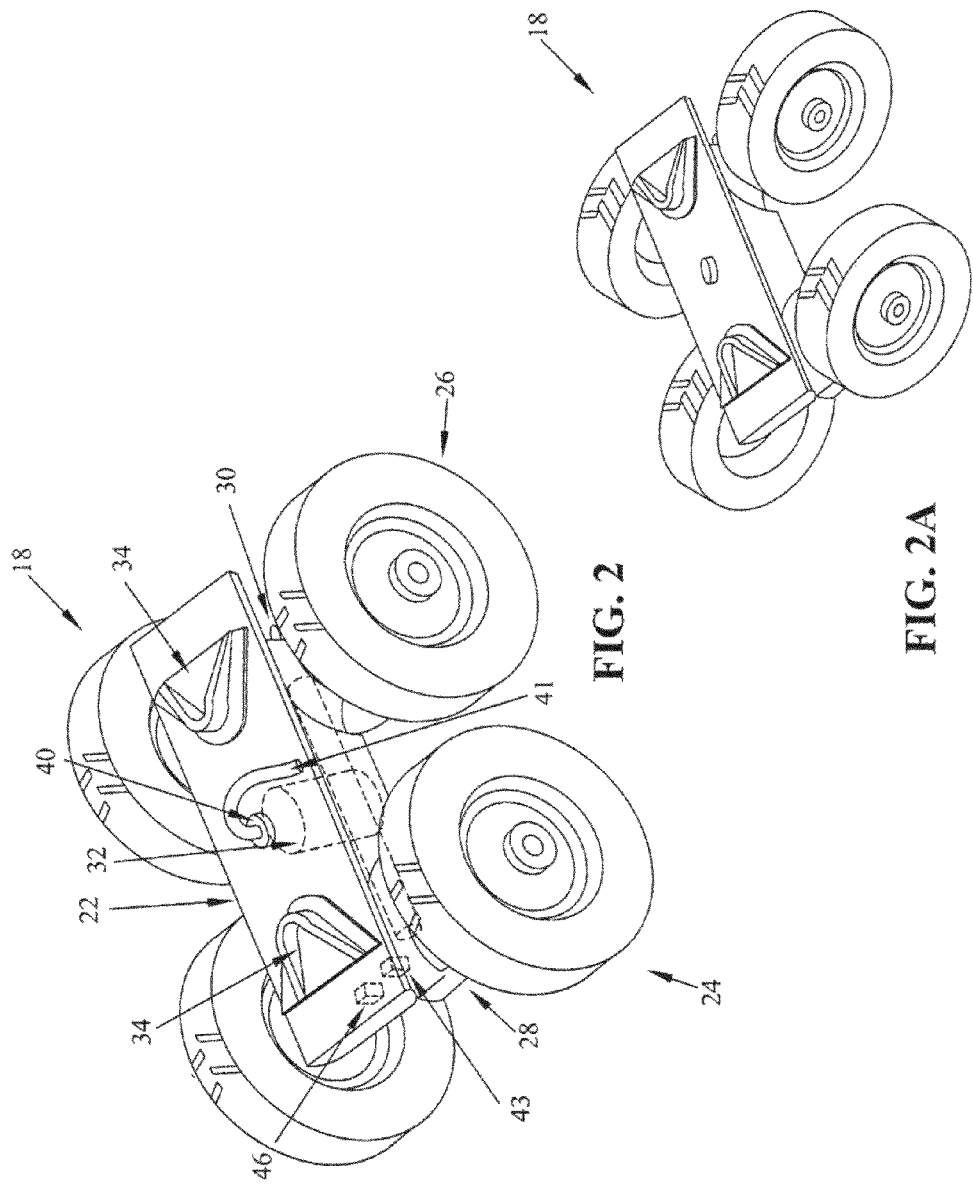

DRIVE QUAD MODULE

FIELD OF THE INVENTION

The present disclosure relates to a harvesting combination including a harvester and a transport vehicle.

BACKGROUND OF THE INVENTION

On occasion, a tractor may not have enough weight to provide sufficient traction to tow trailers containing heavy, harvested crops. For example, the trailers may weigh twice as much as the tractor making it difficult for the weight of the tractor to provide sufficient traction, resulting in slippage of the tractor's wheels. Further, under adverse weather conditions, the tractor may experience even greater slippage because of wet soil or mud. To take advantage of the trailer's weight, a tractor can be mechanically coupled to a drive axle of a trailer. As a result, the tractor's power drives the trailer and the weight of the trailer and the harvested crop enhance the traction at the driven wheels of the trailer.

SUMMARY

According to one embodiment of the present disclosure, a harvesting combination is provided that comprises a harvester configured to harvest a crop from a field, a generator vehicle configured to generate power, a transport vehicle, and a carrier supported by the transport vehicle to receive the crop harvested by the harvester. The transport vehicle includes a chassis and a motor supported by the chassis. The motor is powered by the generator vehicle. The transport vehicle further includes a plurality of traction devices supporting the chassis and a control unit aligning the transport vehicle in relation to at least one of the harvester and a previous path of the harvester.

According to another embodiment of the present disclosure, a harvesting combination is provided comprising a harvester configured to harvest a crop from a field, a generator vehicle configured to generate power, a transport vehicle powered by the generator vehicle, and a carrier supported by the transport vehicle to receive the crop harvested by the harvester. The transport vehicle includes a steering system aligning the transport vehicle along a previous path of the harvester, a control unit controlling the steering system, and a receiving unit in communication with the control unit. The receiving unit receives position data of at least one of the harvester and the previous path of the harvester.

According to another aspect of the present disclosure, a method of positioning a train of transport vehicles in relation to a path of a harvester is provided. The method comprises the steps of providing the train of transport vehicles along a first path of harvested crops and the harvester along a second path. The second path includes a crop to be harvested and is adjacent to at least a portion of the first path. The method further includes harvesting the crops along the second path with the harvester; transferring power to the train of transport vehicles; aligning the train of transport vehicles using the transferred power along the first path to receive harvested crops from the harvester from the second path; aligning the harvester to harvest additional crops along a third path including a crop to be harvested; and aligning the train of transport vehicles in relation to the harvester by laterally shifting.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein:

FIG. 2 is a perspective view of a transport vehicle including a chassis, a plurality of traction devices supporting the chassis;

FIG. 2A is a perspective view of the transport vehicle of FIG. 1;

Figure 1:
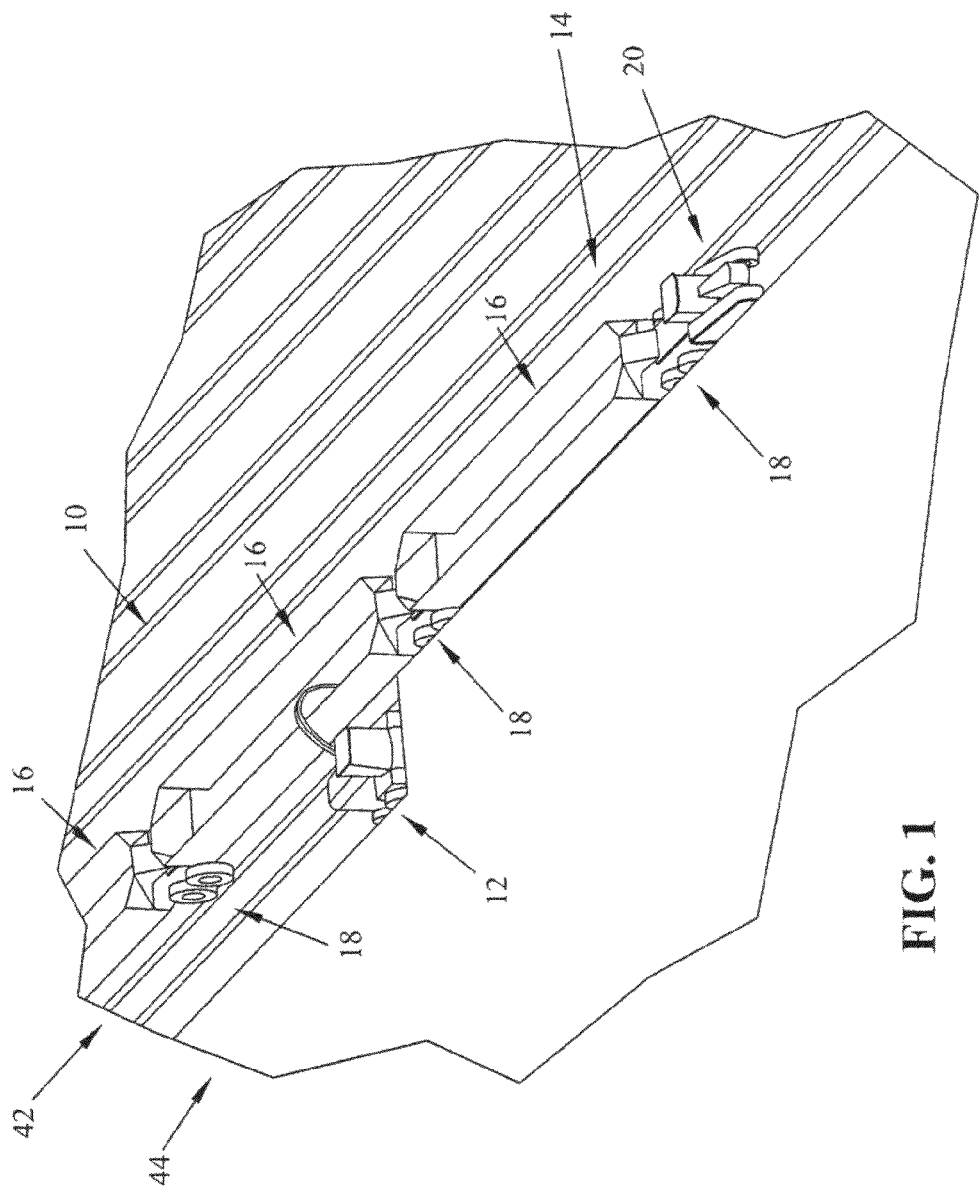
FIG. 1 is a perspective view of a harvesting combination including a harvester, a train of transport vehicles, and a generator vehicle showing the harvester harvesting crops and depositing the crops into the train of transport vehicles.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

In FIG. 1, harvesting combination 10 is shown for harvesting and transporting crops harvested from a field. Harvesting combination 10 includes harvester 12 that harvests the crops and a train of transport vehicles 14 that receives and transports the harvested crops from harvester 12. Harvester 12 is configured to harvest some or substantially all of crops grown in a field including forage crops, such as corn, grasses, and other plants.

Train of transport vehicles 14 includes one or more carriers 16 that receive the harvested crops and one or more transport modules or vehicles 18 that transport carriers 16. Harvesting combination 10 may also include generator vehicle 20 that provides power to transport vehicles 14 to power transporting of carriers 16. Transport vehicle 18 and carrier 16 may be connected end-to-end to form trains 14 of any desired length.

As shown in FIG. 1, transport vehicles 18 are configured to travel over fields during harvesting. However, transport vehicles 18 may also travel over public roads, highways, and other surfaces.

As harvester 12 harvests the crops, it also unloads the harvested crops into carriers 16. As harvester 12 travels through the field, train 14 follows harvester 12 to receive the crops. Each transport vehicle 18 is self-propelled and transports carriers 16 through the field. Generator vehicle 20 travels with train 14 and provides electrical or other power to self-propelled transport vehicles 18. Preferably, generator vehicle 20 does not carry or pull train 14, but is electrically tethered or otherwise coupled to train 14 to provide power thereto. Because generator vehicle 20 is not pulling train 14, it requires less weight to provide traction for itself than if generator vehicle 20 was pulling train 14. Similarly, because each transport vehicle 18 is self-propelled, they require less weight to provide traction because they are not pulling the weight of all carriers 16. According to alternative embodiments, one or more of the transport vehicles may not be self-propelled and the generator vehicle may pull a load, such as a portion of the train.

As shown in FIG. 2, transport vehicle 18 includes chassis 22, first plurality of wheels 24 supporting chassis 22, a second plurality of wheels 26 supporting chassis 22, first steering system 28 operably coupled to first plurality of wheels 24, and a second steering system 30 operably coupled to the second plurality of wheels 26. First steering system 28 is configured to turn first plurality of wheels 24 and second steering system 30 is configured to turn second plurality of wheels 26. Transport vehicle 18 includes at least one drive axle (not shown) coupled to motor 32 and at least one of first plurality of wheels 24 and second plurality of wheels 26 to propel wheels 24, 26 and the remainder of transport vehicle 18 and the load carried thereby, such as carriers 16.

Figure 2C:
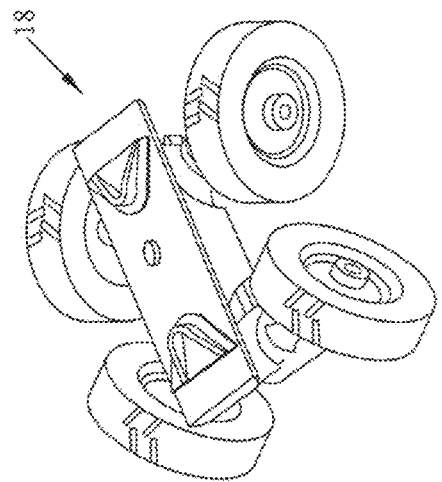
FIG. 2C is a perspective view of the transport vehicle of FIG. 1.
Figure 2D:
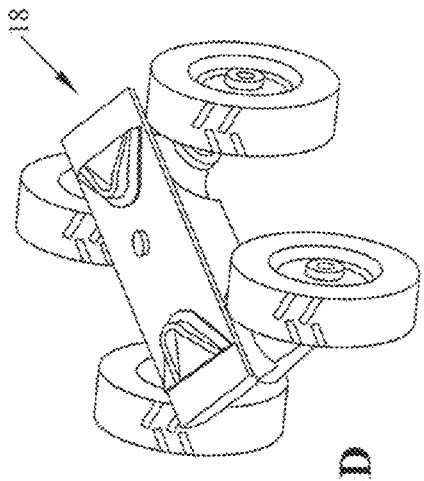
FIG. 2D is a perspective view of the transport vehicle of FIG. 1.
Figure 2B:
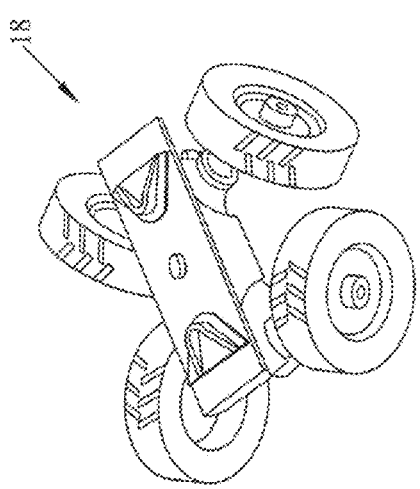
FIG. 2B is a perspective view of the transport vehicle of FIG. 1.
Figure 3:
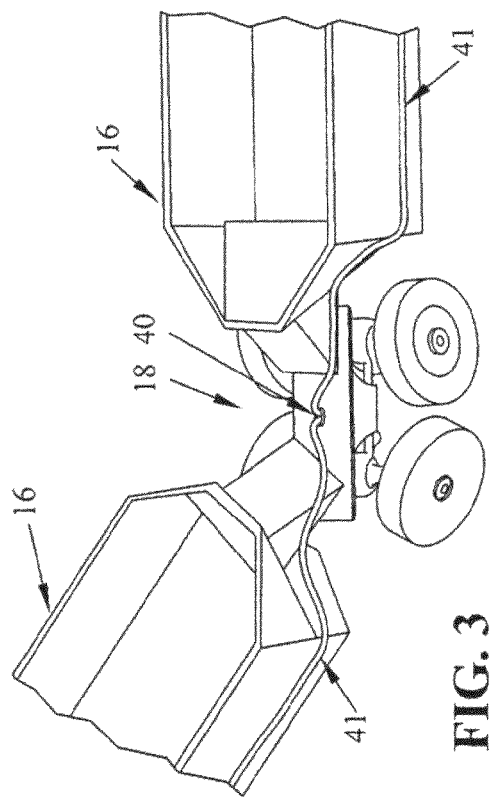
FIG. 3 is a perspective view showing the train of transport vehicles turning.

Transport vehicle 18 includes at least one steering axle (not shown) as part of the first steering system 28 and/or the second steering system 30. As shown in FIGS. 2A-2D, the first and second plurality of wheels 24, 26 are shown in a plurality of steering modes including articulated steering mode, differential steering mode, crab steering mode, and leader/follower steering mode. FIGS. 2A and 2D illustrate alternative crab steering modes with wheels 24, 26 parallel to each other and pointing in a direction to move supported carriers 16 at least partially laterally to their length. FIGS. 2B and 2C illustrated alternative articulated or leader/follower steering modes with wheels 24, 26 pointing in opposite directions to turn vehicles 18. As also shown in FIG. 3, the different steering orientations of transport vehicle 18 can be used to move or turn carriers 16 with only one set of wheels 24, 26 turned.

Motor 32 is preferably an electric motor and generator vehicle 20 preferably generates or otherwise provides electricity to motors 32 of transport vehicles 18. According to alternative embodiments of the present disclosure, motor 32 may be a hydraulic motor, or other any other mechanism for providing mechanical power to turn or propel one or more of wheels 24, 26. Similarly, generator vehicle 20 may provide pressurized fluid to the hydraulic motors or other types of power, such as mechanical power. According to alternative embodiments of the present disclosure, one or more of transport vehicles is self-powered.

Figure 4:
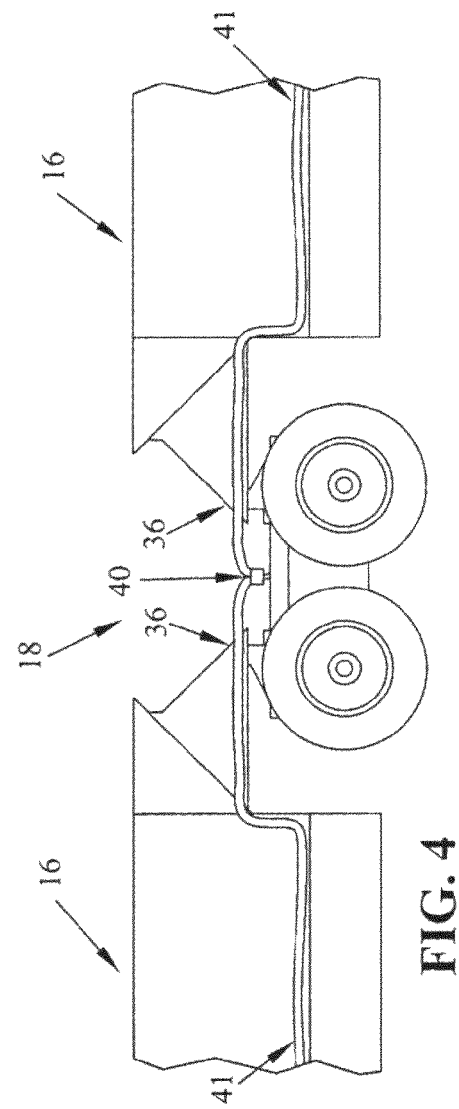
FIG. 4 is a side elevation view of a transport vehicle and a pair of carriers supported by the transport vehicle.

As shown in FIGS. 2, 2A-2D, 3, and 4, transport vehicle 18 also includes socket hitches 34 supported by chassis 22. Socket hitches 34 are configured to couple transport vehicles 18 to carriers 16 (FIG. 4). As shown in FIG. 4, carrier 16 includes post hitches 36 which are received into socket hitches 34 of transport vehicle 18 to allow carriers 16 to turn relative to transport vehicles 18.

As discussed above, generator vehicle 20 is used to power transport vehicles 18. Generator vehicle 20 is illustrated as a tractor having an electric generator. Many tractors 20 include devices to transfer power to other equipment, such as the power take off shaft. Such power take off shafts may be used to provide rotary mechanical power to transport vehicles 18 having mechanisms to self-propel wheels 24, 26. Tractor 20 may be powered with conventional fuels, electricity, or other sources of power. Although a tractor is shown and described for generator vehicle 20, other vehicles and devices such as trucks, bulldozers, front loaders, and other harvesters, may also provide power.

As previously described, each transport vehicle 18 may be equipped with motor 32 for propulsion of the at least one drive axle coupled to at least one of the first plurality of wheels 24 and the second plurality of wheels 26. As illustrated in this embodiment, generating vehicle 20 does not tow transport vehicle 18. Rather, generating vehicle 20 provides power to each transport vehicle 18 of train 14 (FIG. 4B). Since generating vehicle 20 does not tow transport vehicle 18 and carrier 16, the weight of generating vehicle 20 can be reduced because it does not require as much traction. This configuration also allows more weight to be hauled for a given amount of power provided to transport vehicle 18.

A coupler or port 40 and an electric conductor or cable 41, a mechanical linkage, or a hydraulic line, can be used to transfer power from generating vehicle 20 to transport vehicle 18. Conduits 41 can be used to transfer power from one transport vehicles 18 to the next along train 14. Each carrier 16 may also include a harness (not shown) to support cable 41 between transport vehicles 18 as shown in FIG. 4.

Figure 5:
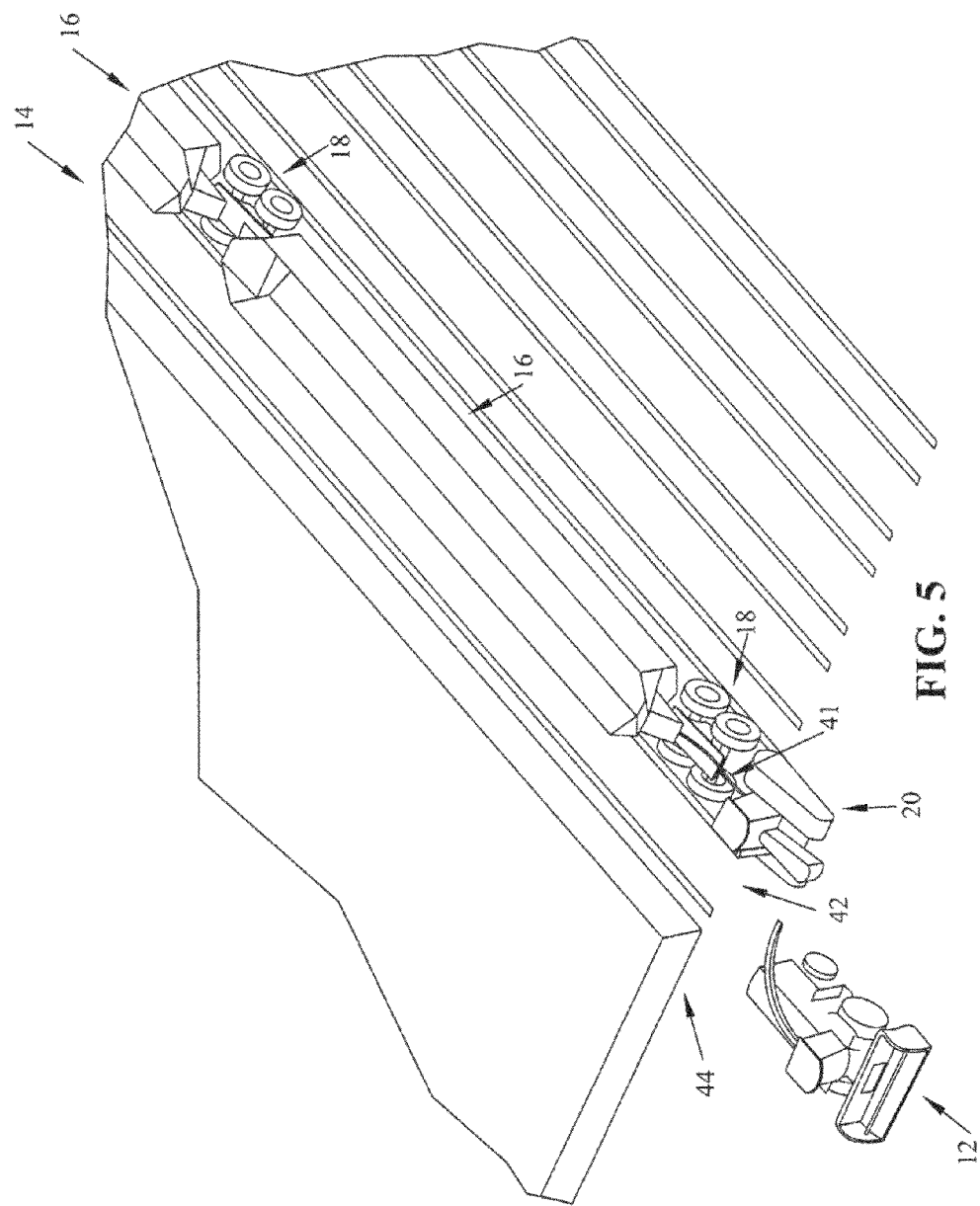
FIG. 5 is a perspective view showing a harvester at an end of a field.

In FIGS. 1 and 5, generating vehicle 20, transport vehicle 18, and carrier 16 are shown arranged in a harvesting formation. The first plurality of wheels 24 and the second plurality of wheels 26 are aligned with the path of generator vehicle 20. First plurality of wheels 24 and the second plurality of wheels 26 are configured to have the same wheel width as harvester 12 (FIG. 1) to minimize soil compaction.

Figure 7:
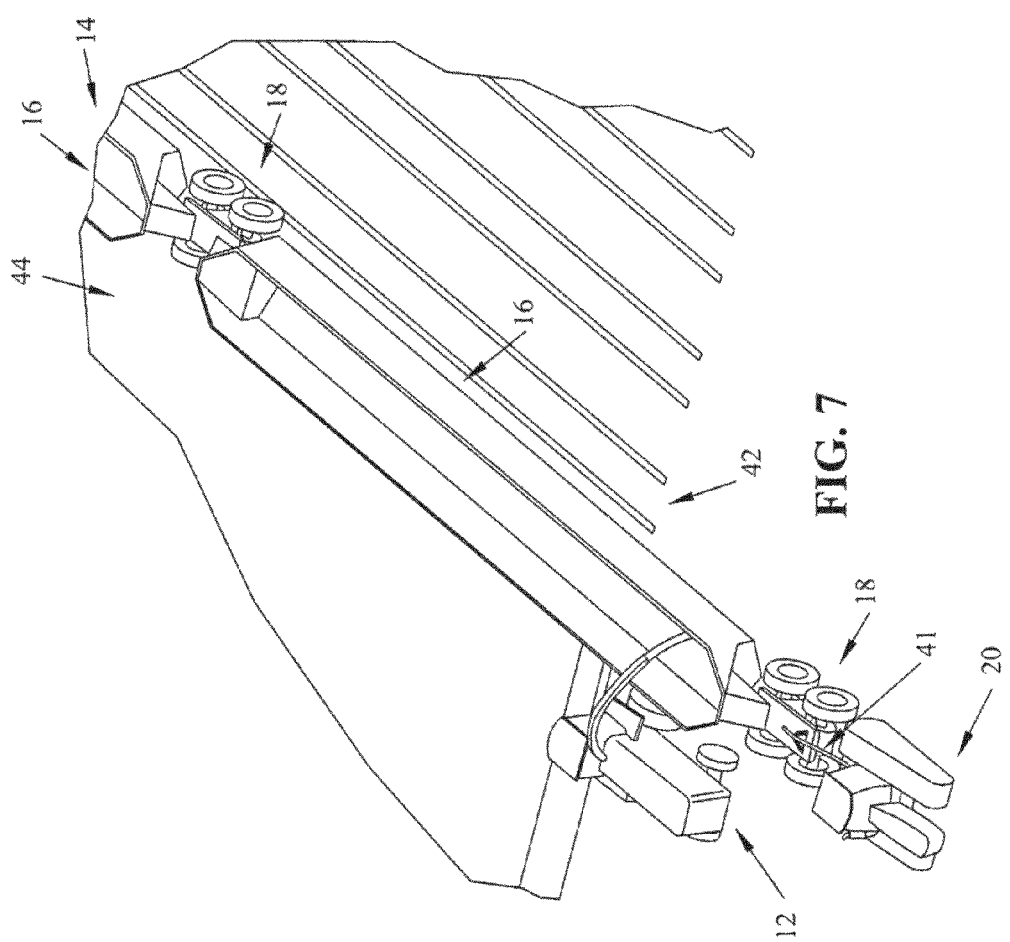
FIG. 7 is a view similar to FIG. 5 showing the train of transport vehicles shifted laterally and the harvester turned to harvest the next row of crops.

FIG. 7 illustrates a partially harvested field that includes previous paths 42 of harvester 12 that have been harvested and how train 14 travels previous path 42 as harvester 12 completes harvesting a path of crops. Train 14 travels previous path 42 which is adjacent to the path of harvester 12 as crops are being harvested, as best shown in FIG. 1. The speed and steering between harvester 12 and train 14 may be synchronized to facilitate the even and balanced transfer of harvested crop from harvester 12 to train 14. Gain tuning may be applied to steering systems 28, 30 in order to approximate the differences in steering when harvester 12 and train 14 are traveling at different speeds.

Figure 6:
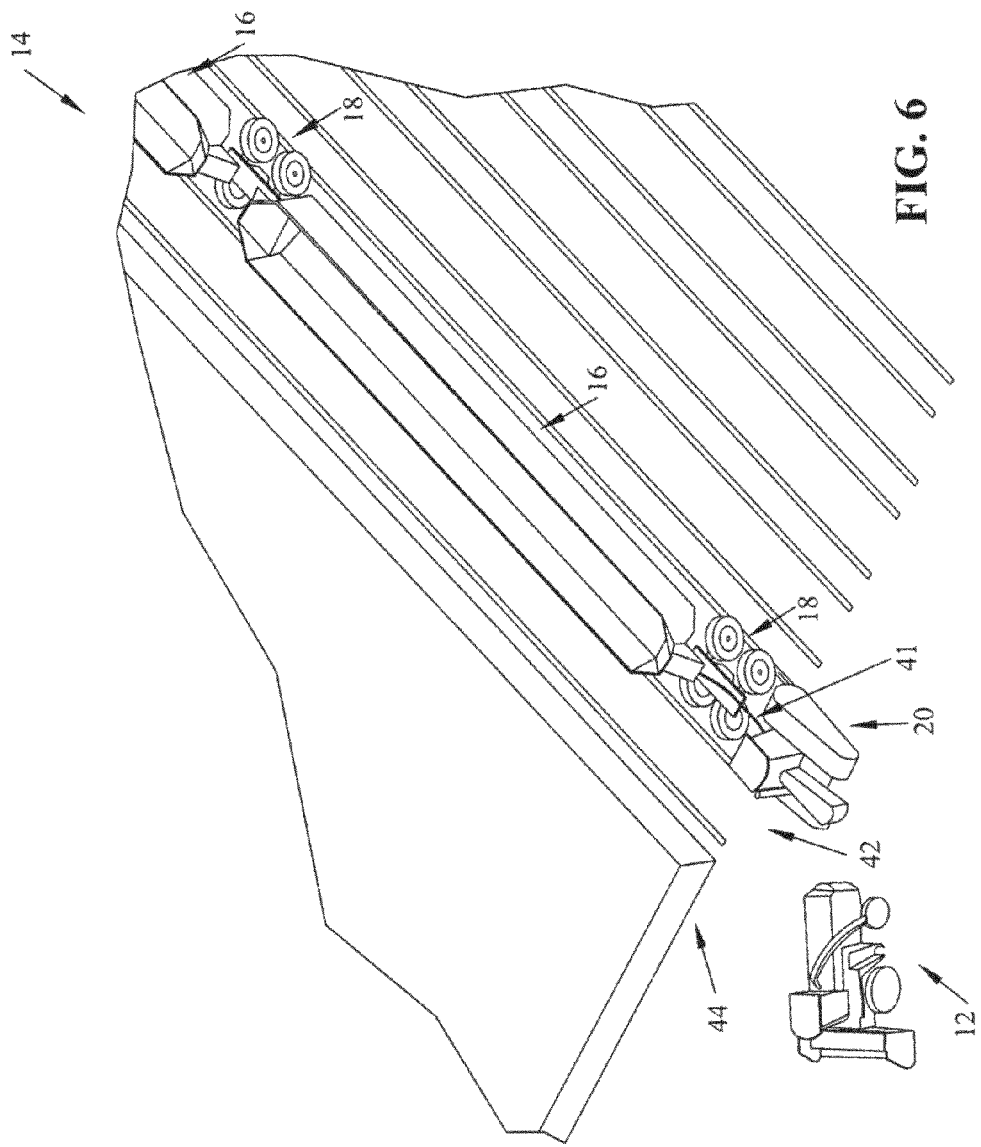
FIG. 6 is a view similar to FIG. 5 showing the harvester turning and the train of transport vehicles beginning to laterally shift toward a path of previously harvested crops.

During a harvesting operation as shown in FIG. 5, harvester 12 completes harvesting row 42 of crops. Harvester 12 is at the end of the field and train 14 and generating vehicle 20 are adjacent to previous path 42 of harvester 12. As harvester 12 turns around to harvest next path 44 of crops, train 14 moves from its current path to previous path 42 of harvester 12. As illustrated in FIG. 6, transport vehicles 18 use a crab steering mode turning wheels 24, 26 to laterally shift train 14 to previous path 42. Using crab steering mode to laterally shift train 14 to previous path 42 minimizes soil compaction. It also minimizes the time, energy, and travel distance required to shift train 14 to previous path 42. During shifting of train 14, an operator of generator vehicle 20 moves generator vehicle 20 into alignment with path 42.

Once train 14 shifts laterally to path 42 as shown in FIG. 7, wheels 24, 26 of transport vehicles 18 are orientated to be parallel with path 42 so that train 14 travels in a path parallel to path 44 to be harvested. Harvester 12 is also repositioned to begin harvesting crops from path 44.

An operator of generating vehicle 20 and train 14 may manually control lateral shifting of train 14 to previous path 42. Alternatively, an electronic control unit 46 provided on transport vehicles 18 or otherwise can be configured to shift train 14 to previous path 42. For example, path of harvester 12 can be tracked and the information relayed to control unit 46 of transport vehicle 18 of train 14. Also, the orientation of harvester 12 in relation to train 14 can be monitored to ensure that train 14 remains in previous path 42.

One or more of transport vehicles 18 may be equipped with a control unit 46 having any one of a tracking system, GPS-based guidance, radio-based guidance or radio-based system, leader/follower guidance technology, and/or row-recognition system or row-recognition technology so that train 14 can track and align to previous path 42 of harvester 12. Using a GPS or other system, harvester 12 transmits information on its position as it travels along previous path 42 based on satellite receiving system. Information about the harvester's previous path 42 and current location are transmitted to a receiving unit 43 coupled to control unit 46 of transport vehicle 18 and/or train 14 so that train 14 follows previous path 42 and remains aligned with the current position of harvester 12 to receive crops.

Similar row-recognition systems are available. A first reference path 42 may be traced using position sensing systems. This path 42 may be used to plan subsequent paths 44 of harvester 12, whether the paths 42 are straight, curved, or concentric. The desired path 42 may consider factors including the area of crops covered during a pass, the turning radius of the vehicles including harvester 12, train 14, and generator vehicle 20, and the size of the work area. Projected paths 44 may be used to guide harvester 12 directly or transmitted to an on-board display to be followed by the human operator. Systems of course correction may be used to minimize cross-track and offset if train 14 deviates from previous path 42.

Harvester 12 and train 14 may be moving at different speeds in order to evenly fill individual carriers 16 of train 14 with harvested crops. For example, because train 14 is much longer than harvester 12, it does not need to travel at the same speed as harvester 12 to travel from one end of a path to the other end. As a result of harvest 12 moving at a faster pace, harvester 12 partially fills each carrier 16 as it harvests each row. Eventually, one or more of carriers 16 fills to a level requiring unloading of carriers 16 to a crop storing or processing facility at which point wheels 24, 26 can be used to steer carriers 16 to the facility.

Figure 8:
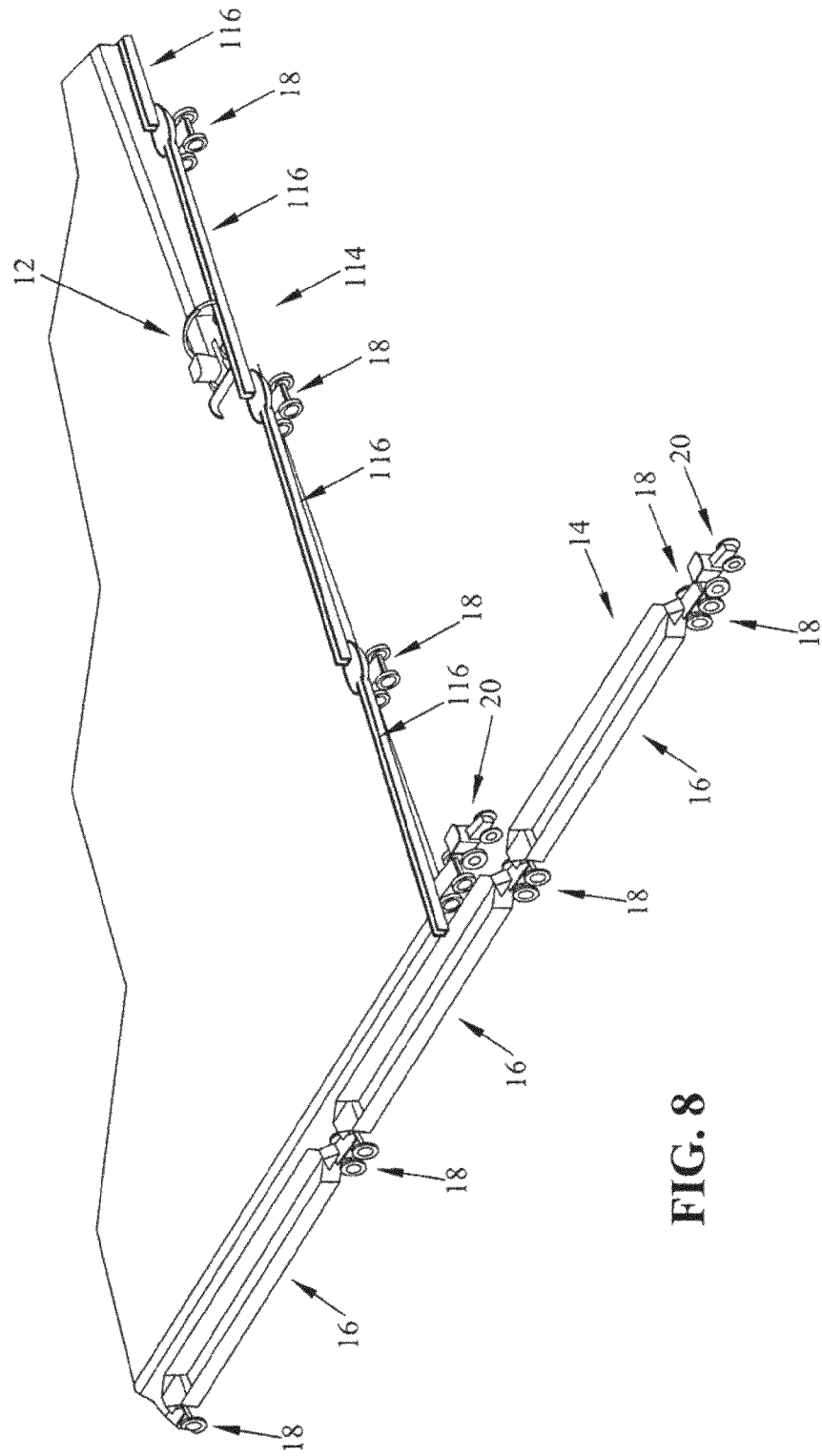
FIG. 8 is a perspective view of an alternative harvesting combination including the harvester of FIG. 1 and an alternative train of transport vehicles including alternative carriers in the form of conveyors.
Figure 9:
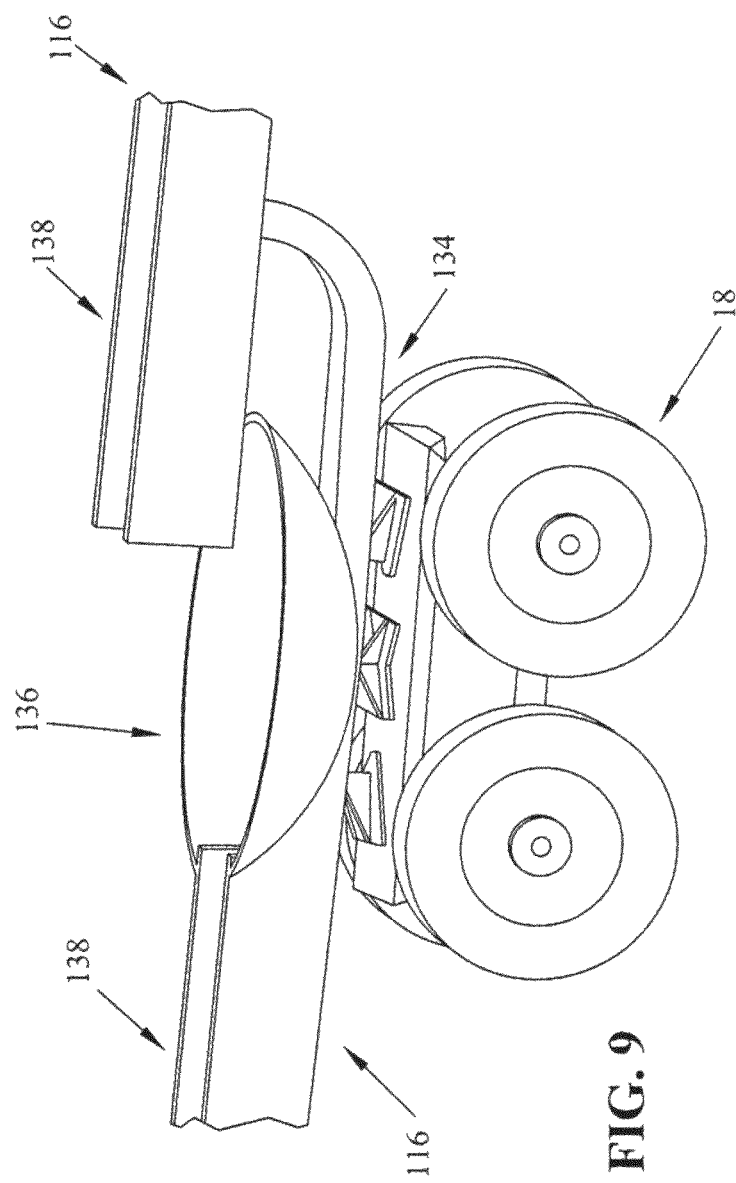
FIG. 9 is an enlarged view of a transport vehicle supporting two conveyor carriers.

While carrier 16 is illustrated as a container in FIGS. 1-7, the features described herein may be illustrated as other a carrier systems such as conveyors shown in FIGS. 8 and 9. As shown in FIG. 8, an alternative carrier 116 is illustrated. Carrier 116 is illustrated as a belt conveyor or as an auger conveyor. Carrier 116 may be powered by another generator vehicle 20.

Transport vehicles 18 are shown in an alternative orientation. In this orientation, transport vehicle 18 are set lateral to the path of harvester 12. As shown in FIG. 8, train of transport vehicles 114 is illustrated as adjacent to the path of harvester 12 to receive harvested crops from harvester 12. Harvested crops, which are placed on carrier 116, move along a plurality of carriers 116 until it reaches train 14 and more specifically carrier 16. In this alternative embodiment, train 14 is adjacent to the end of the field. The last conveyor carrier 116 deposits the harvested crops onto carriers 16 of train 14.

In FIG. 9, carrier 116 is shown in greater detail. Carrier 116 is supported by an alternative hitch 134 of transport vehicle 18. Carrier 116 may include basin 136 to catch harvested crops from previous or adjacent alternative carrier 116 and an inclined auger or belt 138 that moves the harvested crops from basin 136 to a basin 136 of an adjacent carrier 116 or train 14, if at the end of the field.

Figure 10:
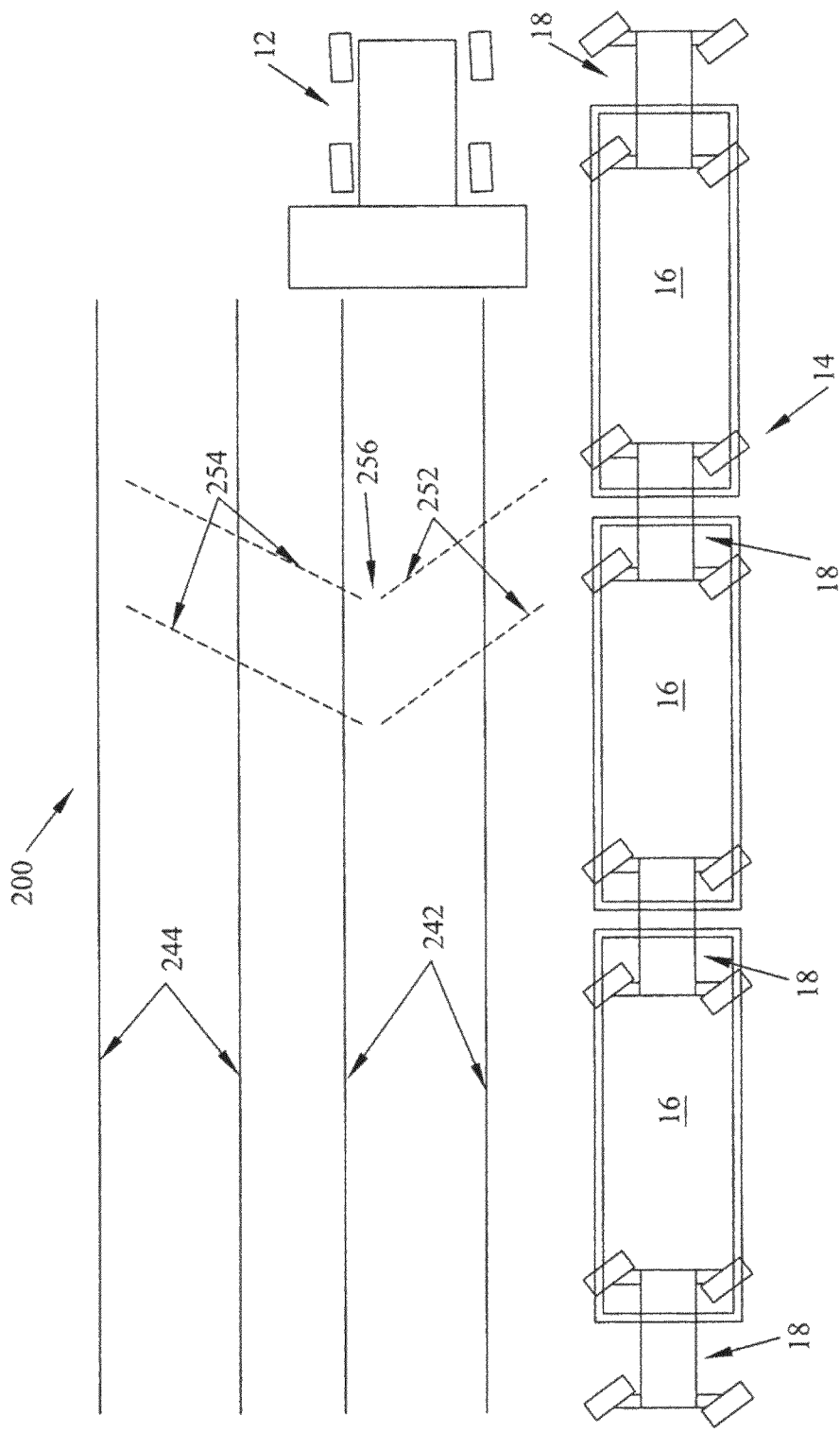
FIG. 10 is a top plan view showing a train of transport vehicles tacking laterally through a field.

In FIG. 10, an alternative harvesting arrangement 200 is illustrated. Harvester 12 harvests crop along harvesting path 242. Train 14 is illustrated as adjacent to harvesting path 242. Train 14 moves laterally toward harvesting path 242 while harvester 12 harvests crop along harvesting path 242.

After harvester 12 reaches an end of path 242, it then realigns to harvest crops along harvested crop path 244. While harvester 12 realigns, train 14 continually moves towards current harvesting path 242 until train 14 is adjacent to harvested crop path 244.

In one embodiment, harvester 12 harvests the crops along the entire length of harvest crop path 242 while train 14 moves laterally toward harvested crop path 242. In this embodiment, train 14 may move at a much slower pace than harvester 12. Furthermore, train 14 may be much longer and cover a shorter travel distance than harvester 12. In this embodiment, the speed and direction of train 14 and the speed of harvester 12 can be synchronized to maintain proper alignment in light of the yield of the crop. This alternative harvesting arrangement 200 may reduce the amount of energy required by train 14 to remain in an adjacent relationship to harvester 12.

As an example, the longitudinal length of harvested crop path 242 may be illustrated as six hundred feet (600'). The lateral width of harvest path 242 may be illustrated as twenty feet (20') similar to an exemplary header width of harvester 12. In this alternative harvesting arrangement 200, harvester 12 is configured to cover the longitudinal length of harvested crop path 242 in approximately the same amount of time as train 14 covers the lateral width of harvest path 242. In this arrangement 200, train 14 is configured to move at a significantly slower pace than harvester 12 and gradually laterally shifts the 20' (i.e. the width of path 242) as harvester 12 travels the 600' of path 242.

Transport vehicles 18 are illustrated in a crab steering orientation to follow a first crab path 252. First crab path 252 is illustrated as at an approximately forty-five degree angle to harvested crop path 242, but may be substantially less than forty-five degrees. As illustrated, transport vehicles 18 may change crab steering orientation to follow second crab path 254 which is at an approximately ninety degree angle from first crab path 252. Using a crab steering orientation, train 14 may tack 256 to keep train 14 in alignment with harvested crop paths 242 and 204 and additional harvested crop paths.

It is also envisioned that transport vehicle 18 may provide a wheel alignment substantially perpendicular to harvested path crop 242. With a wheel alignment substantially perpendicular to harvested path crop 242, train 14 need not tack 256 to remain in alignment with harvested paths 242 and 244. By eliminating the requirement to tack 256, the amount of energy required by train 14 to remain in an adjacent relationship to harvester 12 may be reduced.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A harvesting combination comprising:
a harvester configured to harvest a crop from a field,
a generator vehicle configured to generate power,
a transport vehicle including:
   a chassis,
   a motor supported by the chassis, the motor being powered by the generator vehicle,
   a plurality of traction devices supporting the chassis, and
   a control unit aligning the transport vehicle in relation to at least one of the harvester and a previous path of the harvester; and
a carrier supported by the transport vehicle to receive the crop harvested by the harvester.

2. The combination of claim 1, wherein at least one of the plurality of traction devices of the transport vehicle is operably coupled to a steering system of the transport vehicle to provide a plurality of steering modes that control the direction of travel of the transport vehicle.

3. The combination of claim 2, wherein the plurality of steering modes includes at least one of crab steer mode.

4. The combination of claim 2, wherein the control unit of the transport vehicle is operably coupled to the steering system of the transport vehicle.

5. The combination of claim 1, wherein the transport vehicle includes a port supported by the chassis and the port is configured to provide power from the generator vehicle to the motor.

6. The combination of claim 1, wherein the motor is an electric motor.

7. The combination of claim 1, wherein the motor is a hydraulic motor.

8. The combination of claim 1, wherein the carrier is a conveyor.

9. The combination of claim 1, wherein the carrier is a container.

10. The combination of claim 1, further comprising an electric conductor coupled between the generator vehicle and the transport vehicle.

11. The combination of claim 10, wherein the electric conductor is coupled to the carrier.

12. The combination of claim 1, wherein the transport vehicle includes a hitch supported by the chassis, the hitch supports the carrier, and the hitch couples the carrier to the transport vehicle.

13. The combination of claim 1, wherein the harvester travels along a current path substantially parallel to the previous path.

14. The combination of claim 1, wherein the control unit includes GPS-based guidance.

15. The combination of claim 1, wherein the control unit includes radio-based guidance.

16. The combination of claim 1, wherein the control unit includes a row recognition system being configured to trace the previous path of the harvester.

17. The combination of claim 1, wherein at least one of the harvester and the transport vehicle includes a tracking system configured to locate the previous path.

18. The combination of claim 1, wherein the transport vehicle is self-propelled.

19. The combination of claim 1, wherein the generator vehicle is self-propelled.

20. The combination of claim 1, wherein the generator vehicle powers the transport vehicle by supplying at least one of electrical power, hydraulic power, and mechanical power to the transport vehicle.

21. A harvesting combination comprising:
a harvester configured to harvest a crop from a field,
a generator vehicle configured to generate power,
a transport vehicle powered by the generator vehicle, and the transport vehicle including:
   a steering system aligning the transport vehicle along a previous path of the harvester,
   a control unit controlling the steering system, and
   a receiving unit in communication with the control unit, the receiving unit receiving position data of at least one of the harvester and the previous path of the harvester;
a carrier supported by the transport vehicle to receive the crop harvested by the harvester,
a second transport vehicle, and
a second carrier supported by the second transport vehicle, wherein both the transport vehicle and the second transport vehicle are powered by the generator vehicle.

* * * * *